United States Patent
Jeong et al.

(10) Patent No.: US 9,467,903 B2
(45) Date of Patent: Oct. 11, 2016

(54) UE MOBILITY STATE DETECTION APPARATUS AND METHOD FOR WIRELESS COMMUNICATION SYSTEM

(75) Inventors: Kyeong In Jeong, Hwaseong-si (KR); Soeng Hun Kim, Suwon-si (KR); Jung Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 12/590,273

(22) Filed: Nov. 4, 2009

(65) Prior Publication Data
US 2010/0113019 A1    May 6, 2010

(30) Foreign Application Priority Data

Nov. 5, 2008   (KR) .................. 10-2008-0109570

(51) Int. Cl.
*H04W 36/00* (2009.01)
*H04W 36/32* (2009.01)

(52) U.S. Cl.
CPC ......... *H04W 36/0005* (2013.01); *H04W 36/32* (2013.01)

(58) Field of Classification Search
CPC ... H04W 36/04; H04W 36/18; H04W 36/24; H04W 36/30; H04W 36/32; H04W 48/18; H04W 80/04
USPC .................................. 455/436–453; 370/331
See application file for complete search history.

(56) References Cited

U.S. PATENT DOCUMENTS 5,530,910 A * 6/1996 Taketsugu ............. H04W 36/04
455/444
5,822,696 A * 10/1998 Bergkvist .............. H04W 36/04
455/436
7,480,519 B2   1/2009 Jeong et al.
(Continued)

FOREIGN PATENT DOCUMENTS

EP           1986452 A1     10/2008
KR       20060099462 A      9/2006
WO     WO2008001452 A1 *   1/2008

OTHER PUBLICATIONS

3GPP TS 36.331 V8.3.0 (Published: Sep. 2008; E-UTRA RRC Protocol Specification, Release 8).*
(Continued)

*Primary Examiner* — Nalini Mummalaneni

(57) ABSTRACT

A method for transmitting information required for user equipment mobility state detection is provided. The method includes broadcasting, at a base station, system information including frequency information and cell identifiers (IDs) of cells co-located with a current cell geographically; and transmitting, when an handover is detected, a handover command message including a handover factor indicator indicating whether the handover was triggered by movement of the user equipment, wherein the user equipment detects the mobility state based on the information provided by the system information and the handover command message. The apparatus and method of the present invention allows the UE to add the cell reselection/handover triggered by movement of the UE to the number of cell reselections/handovers and subtract the cell reselection/handover triggered by a non-mobility factor from the number of cell reselections/handovers used for determining the UE mobility state thereby improving accuracy of the UE mobility state detection.

9 Claims, 7 Drawing Sheets

(56) References Cited

U.S. PATENT DOCUMENTS

| | | |
|---|---|---|
| 2002/0102967 A1* | 8/2002 | Chang et al. .................. 455/414 |
| 2004/0053626 A1* | 3/2004 | Yagi ............................ 455/456.1 |
| 2005/0261017 A1* | 11/2005 | Vaittinen et al. ............. 455/522 |
| 2006/0258386 A1 | 11/2006 | Jeong et al. |
| 2007/0232311 A1* | 10/2007 | Kuhn .................... H04W 36/22 455/436 |
| 2009/0075656 A1* | 3/2009 | Tolli .................. H04W 36/0094 455/436 |
| 2009/0086676 A1* | 4/2009 | Meylan et al. ................ 370/331 |
| 2009/0117905 A1* | 5/2009 | Watanabe et al. ............ 455/437 |
| 2009/0238117 A1* | 9/2009 | Somasundaram ... H04J 11/0093 370/328 |
| 2010/0165950 A1 | 7/2010 | Abeta et al. |

OTHER PUBLICATIONS

3GPP TS 23.009 V7.0.0 (3GPP Technical Specification Group Core Network and Terminals; Handover Procedures; Published Mar. 2007).*

3GPP TS 25.331 8.4.0 (3GPP Technical Specification Group; Radio Resource Control (RRC); Protocol specification; Published Sep. 2008).*

3GPP TS 36.304 V 8.3.0 (3rd Generation Partnership Project; Technical Specification Group Radio Access Network; Evolved Universal Terrestrial Radio Access (E-UTRA); User Equipment (UE) procedures in idle mode; Published Sep. 2008).*

3GPP TS 36.304 V8.3.0 (Sep. 2008) Technical Specification Group Radio Access Network; Evolved Universal Terrestrial Radio Access (E-UTRA); User Equipment (UE) procedures in idle mode (Release 8).*

* cited by examiner

US 9,467,903 B2

UE MOBILITY STATE DETECTION APPARATUS AND METHOD FOR WIRELESS COMMUNICATION SYSTEM

CROSS-REFERENCE TO RELATED APPLICATION(S) AND CLAIM OF PRIORITY

The present application is related to and claims priority to an application entitled "UE MOBILITY STATE DETECTION APPARATUS AND METHOD FOR WIRELESS COMMUNICATION SYSTEM" filed in the Korean Intellectual Property Office on Nov. 5, 2008 and assigned Serial No. 10-2008-0109570, the contents of which are incorporated herein by reference.

TECHNICAL FIELD OF THE INVENTION

The present invention relates to wireless communications and, in particular, to a User Equipment (UE) mobility state detection apparatus and method for detecting the mobility state of a UE accurately by subtracting the cell reselections or handovers that occurred regardless of the UE mobility from a number of cell reselections or handovers used for determining the UE mobility state.

BACKGROUND OF THE INVENTION

Long Term Evolution (LTE) as the next evolutionary technology of the 3rd generation mobile communication system known as Universal Mobile Telecommunication Service (UMTS) is designed to provide improved high speed packet data services based on Orthogonal Frequency Division Multiplexing (OFDM).

In the $3^{rd}$ Generation Partnership Project (3GPP) TS36.304 and TS36.311, the speed-dependent parameters such as the number of cell reselections (applicable to the UE in idle mode) and the number of cell changes, e.g. handovers, (applicable to the UE in connected mode) are specified. According to these technical specifications, the mobility state of a UE is determined by comparing the number of cell reselections or cell changes measured during a specific time period counted, by a timer with a threshold value. However, the cell reselection and handover can occur even when the UE does not move. For instance, the handover is triggered for the purpose of load balancing, UE/user service profile adaptation, a UE capability adaptation, and Radio Resource Management (RRM), and this means that handover can occur regardless of the UE mobility. Although the handover occurs typically due to the movement of the UE, it is not always true that all the handovers are caused by the movement of the UE. For this reason, the conventional method for detecting the mobility state of the UE based on the number of cell reselections or handovers is likely to cause inaccuracy in the UE mobility state detection.

SUMMARY OF THE INVENTION

To address the above-discussed deficiencies of the prior art, it is a primary object to provide a UE mobility state detection apparatus and method that is capable of improving the accuracy of mobility state detection.

Also, the present invention provides a UE mobility state detection apparatus and method that is capable of detecting the mobility state of a UE accurately by counting only the cell reselections or handovers related to UE mobility, i.e. caused by the UE crossing the cell boundary, but subtracting the cell reselections or handovers that occurred regardless of the mobility from a number of cell reselections and handovers used for determining the UE mobility state.

In accordance with an exemplary embodiment of the present invention, a method for transmitting information required for user equipment mobility state detection in a wireless communication system includes broadcasting, at a base station, system information including frequency information and cell identifiers (IDs) of cells co-located with a current cell geographically; and transmitting, when an handover is detected, a handover command message including a handover factor indicator indicating whether the handover is triggered by movement of the user equipment, wherein the user equipment detects the mobility state based on the information provided by the system information and the handover command message.

In accordance with another exemplary embodiment of the present invention, a mobility state detection method of a user equipment in a wireless communication system includes receiving system information; determining, based on the system information, whether a reselected cell is co-located with a previous cell geographically; subtracting, when the reselected cell is co-located with the previous cell, the cell reselection from a number of cell reselections, and adding, when the reselected cell is not co-located with the previous cell, the cell reselection to the number of cell reselections; and detecting a mobility state by comparing the number of cell reselections with at least one predetermined threshold value.

In accordance with another exemplary embodiment of the present invention, a mobility state detection method of a user equipment in a wireless communication includes subtracting, when a handover command message is received and the handover is triggered by a non-mobility factor, the handover from of a number of handovers and, otherwise, adding the handover to the number of handovers; and detecting a mobility state by comparing the number of handovers with at least one predetermined threshold value.

In accordance with another exemplary embodiment of the present invention, a user equipment mobility state detection method for a wireless communication system includes transmitting, at a base station, system information including information on cells co-located with a current cell geographically and, when a handover occurs, a handover command message including a handover factor indicator indicating whether the handover is triggered by movement of the user equipment; subtracting, when a cell reselection occurs and the reselected cell is co-located with the previous cell geographically, the cell reselection from a number of cell reselections and, when the reselected cell is not co-located with the previous cell, adding the cell reselection to the number of cell reselections; subtracting, when a handover command message is received and the handover is triggered by a non-mobility factor, the handover from a number of handovers and adding, when the handover is triggered by movement of the user equipment, the handover to the number of handovers; and detecting a mobility state by comparing the number of cell reselections and the number of handovers with at least one predetermined threshold value.

In accordance with another exemplary embodiment of the present invention, an apparatus for transmitting information required for user equipment mobility state detection in a wireless communication system includes a handover unit which determines a handover of a user equipment based on a measurement report context of the user equipment, a user equipment context, and a Radio Resource Management (RRM) context; an information generator which generates system information including information on cells co-located with a current cell based on the RRM context and a neighbor cell context and generates, when a handover occurs, a handover command message including a mobility factor indicator provided by the handover unit; and a communication unit which broadcasts the system information output by the information generator and transmits the handover message to the user equipment.

In accordance with still another exemplary embodiment of the present invention, a user equipment mobility state detection apparatus for a wireless communication system includes a communication unit which receives system information and a handover command message; a information analysis unit which analyzes the system information to determine whether a reselected cell is co-located with a previous cell geographically and analyzes the handover command message to determine whether a handover is triggered by movement of the user equipment; and a mobility state detection unit which adds, only when the reselected cell is not co-located with the previous cell geographically, the cell reselection to the number of cell reselections, and adds, only when the handover is triggered by movement of the user equipment, the handover to the number of handovers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
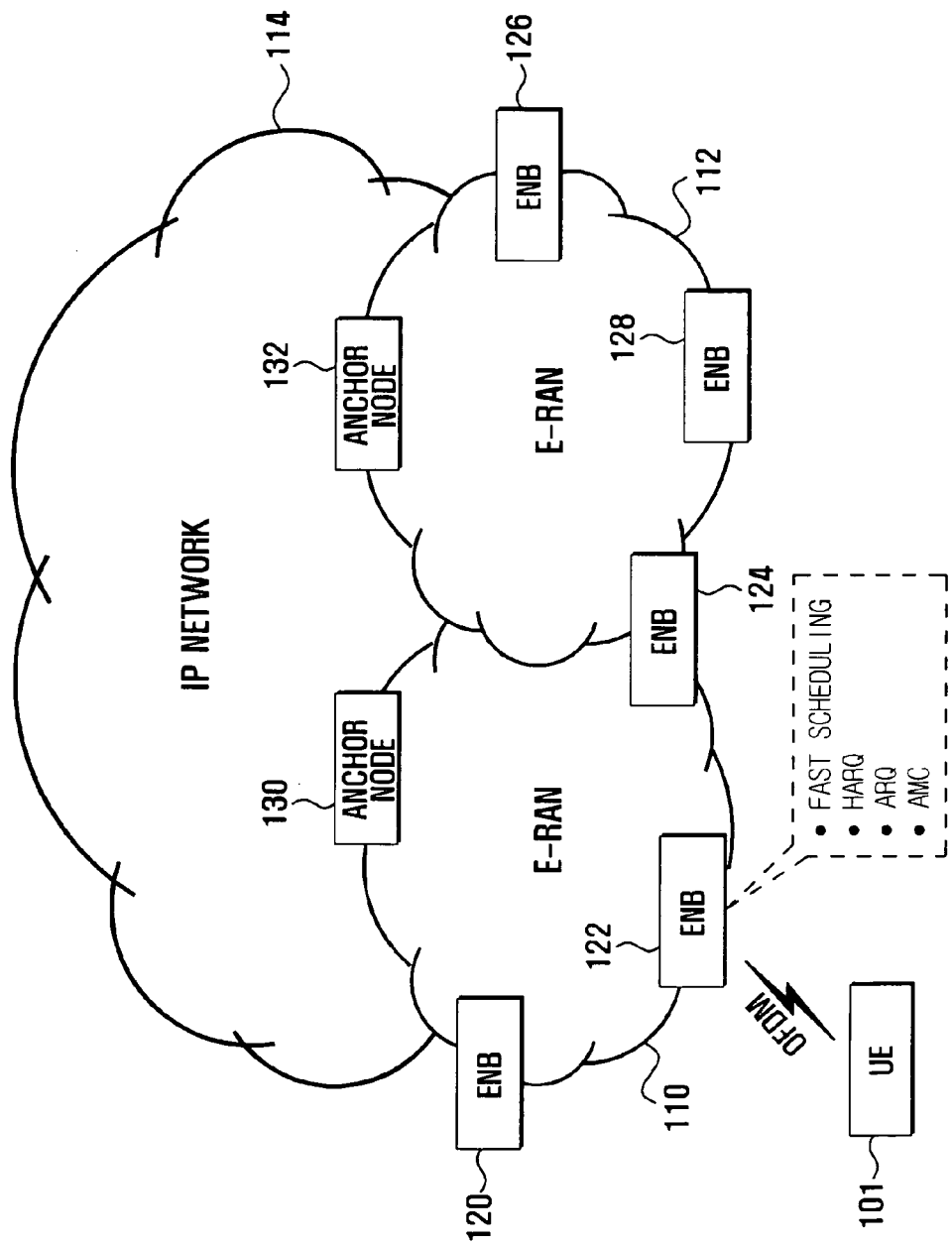
FIG. 1 is a diagram illustrating an LTE system to which the radio link failure detection method of the present invention is adopted.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In an exemplary embodiment of the present invention, a method for efficiently reducing mobility state detection error is provided. As aforementioned, cell reselection and handover does not occur only with the movement of the UE. If the cell reselections and handovers irrelevant to the movement of the UE are considered, this can cause a mobility state error. In an exemplary embodiment of the present invention, the cell reselections and handovers irrelevant to the movement of the UE are ruled out so as to detect the UE mobility state accurately.

In an exemplary embodiment of the present invention, when a handover is initiated, an evolved Node B (hereinafter called eNB) sends the UE operating in connected mode a handover command message that includes information on whether the handover was triggered by movement of the UE (i.e., mobility-triggered handover) or other factors (e.g., handover for load balancing and UE/user service profile adaptation). The UE checks the handover trigger information provided by the handover command message and adds only mobility-triggered handovers to the number of handovers used for detecting the mobility state of the UE. If the handover is not the mobility-triggered handover, the UE subtracts the handover from the number of handovers. The eNB also broadcasts system information containing geographical location cell information (frequency information and cell ID) within the cell for the UE operating in idle mode. When a cell reselection occurs, the UE in idle mode counts only the cell reselection in which the reselected cell and the previous cell differ from each other in geographical location in the number of cell reselections. If the reselected cell and the previous cell are identical with each other in geographical location, the UE subtracts the cell reselection from the number of cell reselections used for determining the UE mobility state. In an exemplary embodiment of the present invention, the UE in connected mode can detect the UE mobility state based on the system information. That is, when the handover target cell and the serving cell differ from each other in geographical location (i.e., when the target cell and the serving cell are located in different geographical regions), the UE in connected mode adds the handover to the number of handovers used for determining the UE mobility state and, otherwise, subtracts the handover from the number of handovers.

The UE mobility state detection method according to an exemplary embodiment of the present invention is described hereinafter.

The Long Term Evolution (LTE) as the next evolutionary technology of the $3^{rd}$ generation mobile communication system known as Universal Mobile Telecommunication Service (UMTS) provides high speed packet data services based on Orthogonal Frequency Division Multiplexing (OFDM). Although the exemplary embodiments are directed to the LTE system, the UE mobility state detection method of the present invention can be applied to other types of wireless communication systems.

FIG. 1 is a diagram illustrating an LTE system to which the radio link failure detection method of the present invention is adopted.

As shown in FIG. 1, an LTE system is characterized with the Evolved Radio Access Networks (hereinafter called E-RAN) 110 and 112 having only two infrastructure nodes: the Evolved Node Bs (hereinafter called ENB or Node B) 120, 122, 124, 126, and 128 and the anchor nodes 130 and 132. A User Equipment (UE) 101 connects to the Internet Protocol (IP) network 114 via an eNB and an anchor node. The UE 101 is connected to the eNB 122 through a radio channel, and the eNB 122 is responsible for cell and radio resource management. For instance, the eNB 122 broadcasts the control information in the form of system information within the cell, allocates radio resources to the UEs for transmission and reception of data and control information, and determines handover of the UEs based on the channel measurement information of the serving and neighbor cells. The eNB 122 includes control protocols such as Radio Resource Control (RRC) protocol related to the radio resource management.

Figure 2:
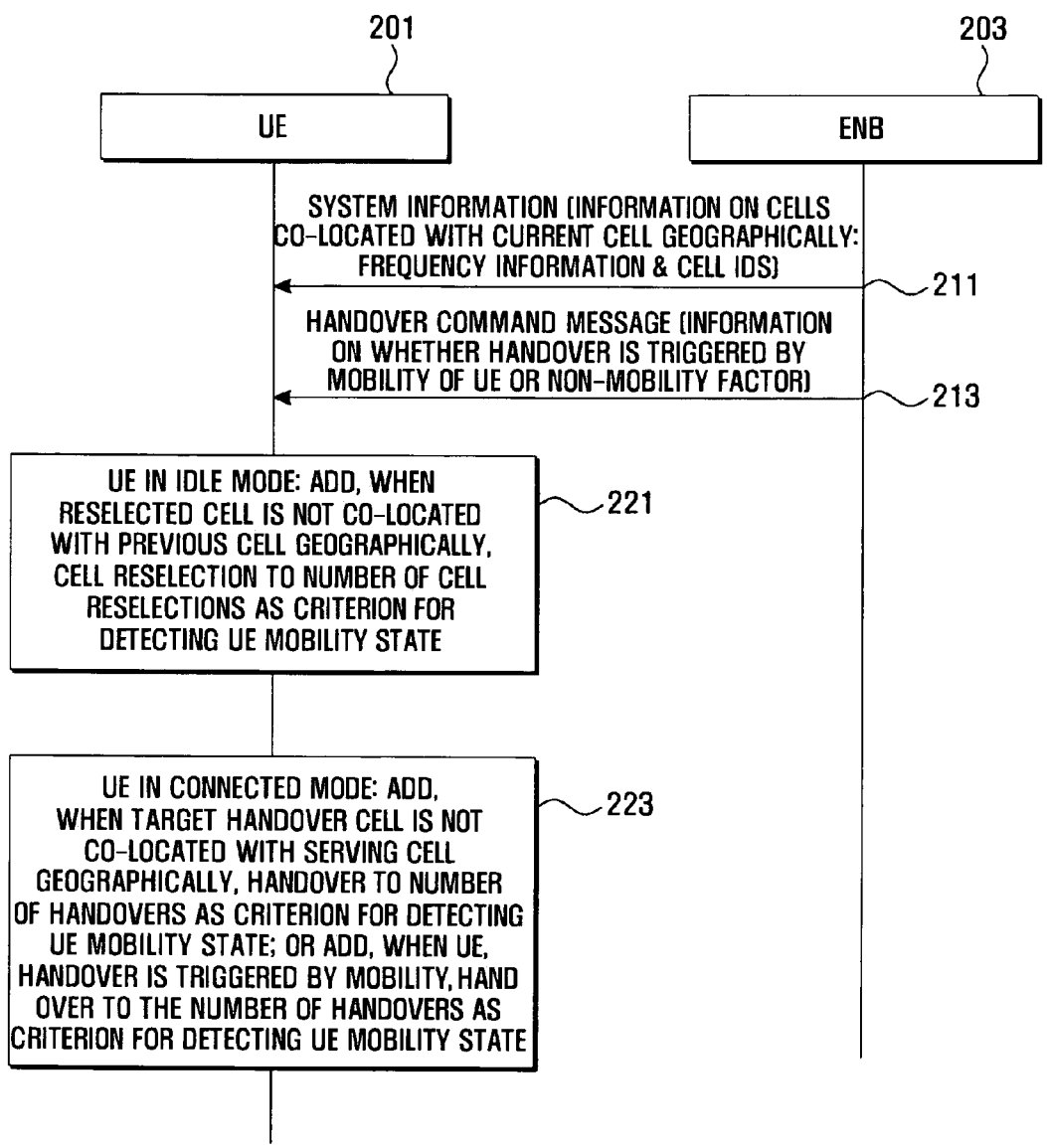
FIG. 2 is a sequence diagram illustrating operations of a UE and an evolved Node B (eNB) of an LTE system for a UE mobility state detection method according to an exemplary embodiment of the present invention.

FIG. 2 is a sequence diagram illustrating operations of a UE and an eNB of an LTE system for a UE mobility state detection method according to an exemplary embodiment of the present invention. In FIG. 2, reference numeral 201 denotes a UE, and reference numeral 203 denotes an eNB.

The UE can be operating in idle mode or connected mode. The operations of the UE follow the operations in RRC idle and RRC connected states specified in the 3GPP TS36.331.

Referring to FIG. 2, first the eNB 203 broadcasts the system information (211). The system information includes the information on the cells identical/same/similar to the current cell in geographical location (i.e., co-located). In the following description, the terms 'same', 'identical', and 'similar' are synonymously used to express the geographically same location. The system information includes the frequency information and cell IDs of the co-located cells. When handover is required for the UE 201, the eNB 203 sends a handover command message to the UE 201 (213). The handover command message includes the information on whether the handover is a mobility-triggered handover or non-mobility factor-triggered handover. The non-mobility factor-triggered handover can include handovers for load balancing, UE capability adaptation, and UE/user profile adaptation.

As aforementioned, the eNB 203 broadcasts the system information including the information about cells co-located with the current cell geographically (including frequency and cell ID of each cell) (211) and transmits, when the UE 201 is required to perform a handover, the handover command message including the information on whether the handover is a mobility triggered handover or non-mobility factor-triggered handover to the UE 201 (213).

The UE 201 in idle mode receives the system information transmitted by the eNB 203 and checks the location information of the cell. That is, the UE 201 in idle mode determines whether the reselected cell is identical to the previous cell geographically based on the system information received at step 211 and adds, if the reselected cell differs from the previous cell, the cell reselection to the number of cell reselections used for determining the UE mobility state (221). If the reselected cell is identical with the previous cell geographically, the UE 201 subtracts the cell reselection from the number of cell reselection. At this time, if the frequency information and cell ID of the reselected cell is included in the system information from the previous cell or the frequency information and cell ID of the previous cell is included in the system information of the reselected cell, the UE determines that the reselected cell is identical with the previous cell geographically. Otherwise, if the frequency information and cell ID of the reselected cell is not included in the system information of the previous cell and the frequency information and cell ID of the previous cell is not included in the system information of the reselected cell, the UE 201 determines that the reselected cell differs from the previous cell geographically.

The UE 201 in connected mode can use the system information broadcasted by the eNB 203 at step 211 or the handover command message transmitted by the eNB 203 at step 213.

In case of using the system information, the UE 201 in connected mode checks whether the handover target cell is identical with the serving cell geographically in the same manner as step 221 and, if the target cell differs from the serving cell geographically, adds the handover the number of handovers and, otherwise, subtracts the handover from the number of handovers used for determining the UE mobility state. This operation is applied to the case of cell reselection in the same manner. That is, in case of using the system information for cell reselection, the UE 201 in connected mode adds the cell reselection to the number of cell reselections used for determining the UE mobility state only when the reselected cell differs from the previous cell geographically.

In case of using the handover command message, the UE 201 in connected mode checks the handover command message transmitted by the eNB 203 at step 213 (223). If the handover command message is received, the UE 201 in connected mode analyzes the handover command message and determines whether the handover is a mobility-triggered handover or non-mobility factor-triggered handover. The UE 201 adds only the mobility-triggered handover to the number of handovers used for determining the UE mobility state. Otherwise, if the handover is a non-mobility factor-triggered handover, the UE 201 subtracts the non-mobility factor-triggered handover from the number of handovers used for determining the UE mobility state.

As described above, the UE in idle mode analyzes the system information broadcasted by the eNB and adds the cell reselection in which the reselected cell differs from the previous cell geographically (i.e., when the UE has moved) to the number of cell reselections used for determining the UE mobility state. The UE in connected mode can use both the system information broadcasted by the eNB and the handover command transmitted by the eNB to detect the UE mobility state. In the case of using the system information broadcasted by the eNB, the UE adds the handover (or cell reselection) in which the target cell (or reselected cell)

differs from the serving cell (or previous cell) geographically to the number of handovers (or cell reselections) used for determining the UE mobility state. In the case of using the handover command message, the UE analyzes the handover command message transmitted by the eNB and adds only the mobility-triggered handover to the number of handovers used for determining the UE mobility state.

The UE counts the cell reselections or handovers until a mobility state detection timer expires and compares the number of cell reselections or the handovers with a predetermined threshold value. The operations for determining the UE mobility state after the comparison follows the procedure specified in the 3GPP TS36.304 and TS36.331.

Figure 3:
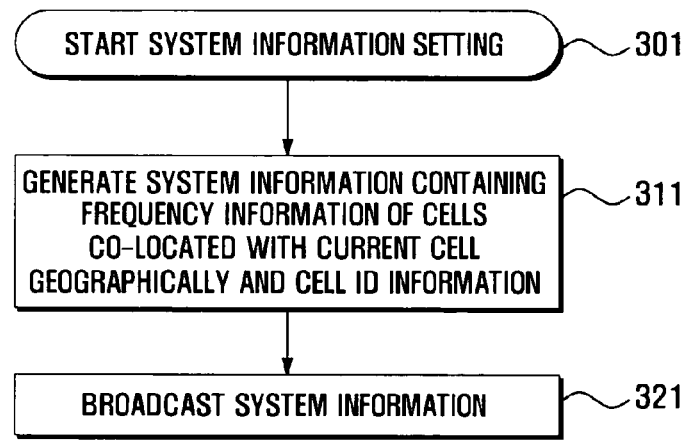
FIG. 3 is a flowchart illustrating operations of the eNB for broadcasting the system information in the UE mobility state detection method according to an exemplary embodiment of the present invention.
Figure 4:
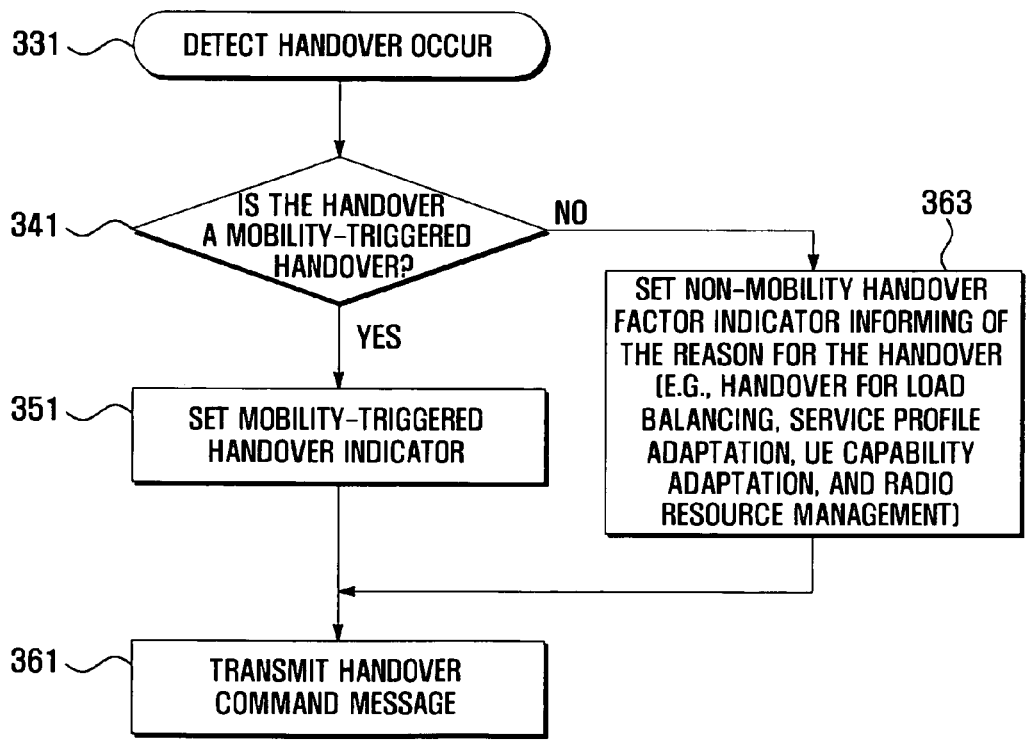
FIG. 4 is a flowchart illustrating operations of the eNB for transmitting the handover command message in the UE mobility state detection method according to an exemplary embodiment of the present invention.

FIGS. 3 and 4 are flowcharts illustrating operations of the eNB for broadcasting the system information and transmitting the handover command message, respectively, for use in the UE mobility state detection method according to an exemplary embodiment of the present invention. FIG. 3 shows the system information broadcast process of the eNB 203 at step 211 in more detail, and FIG. 4 shows the handover command message transmission process of eNB 203 at step 213 in more detail.

Referring to FIG. 3, the eNB 203 starts configuration of the system information to be broadcast within the cell (301). The eNB 203 generates the system information containing the frequency information and cell IDs of the cells that are co-located with the current cell geographically (311). The system information can be generated based on the neighbor cell context retained in the eNB 203. The eNB 203 broadcasts the system information based on the neighbor cell context within the cell (321).

Referring to FIG. 4, the eNB detects a handover of the UE 201 (331) and determines whether the handover is a mobility-triggered handover or non-mobility factor-triggered handover (341). If it is determined that the handover is a mobility-triggered handover, the eNB 203 sets a mobility-triggered handover indicator on (351). Otherwise, if it is determined that the handover is a non-mobility factor-triggered handover, the eNB 203 sets a non-mobility handover factor indicator informing of the reason for the handover (363). For instance, the non-mobility factor handover indicator informs of the reason for the handover such as load balancing, service profile adaptation, UE capability adaptation, and Radio Resource Management. The handover factors can be signaled individually, but what is important in the present invention is whether the handover is triggered by movement of the UE or another factor. Accordingly, in an exemplary embodiment of the present invention, a single parameter such as a mobility handover factor indicator, e.g. a flag, is used to indicate whether the handover is triggered by movement or another factor. Once the mobility-triggered handover indicator is set, the eNB 203 transmits a handover command message containing the mobility-triggered handover indicator to the UE 201 (361).

Figure 5:
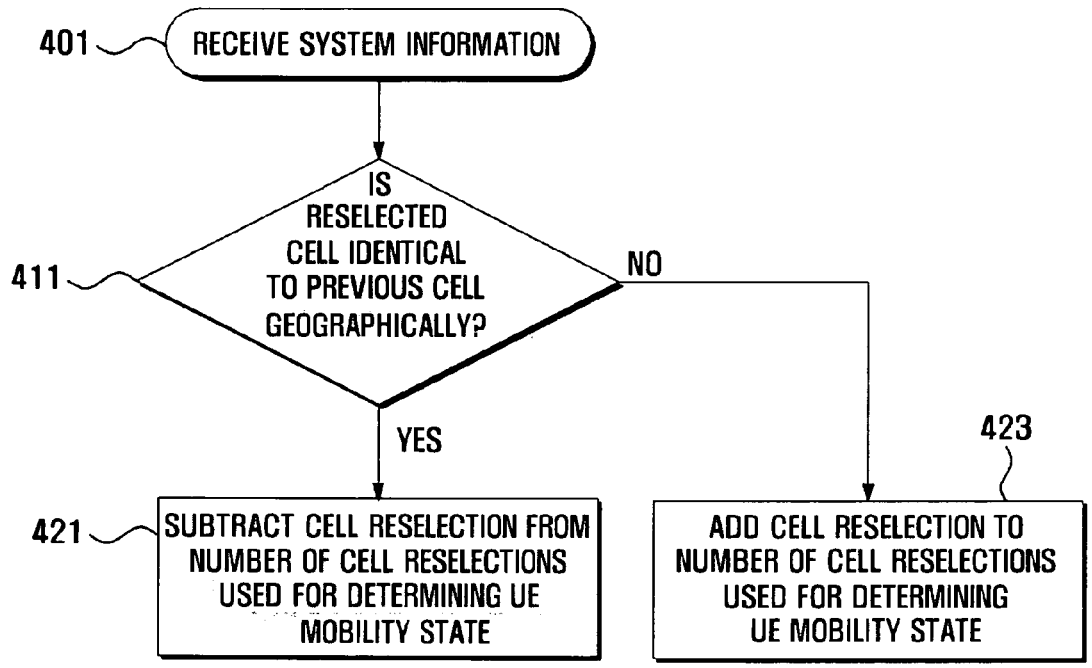
FIG. 5 is a flowchart illustrating operations of the UE for receiving the system information in the UE mobility state detection method according to an exemplary embodiment of the present invention.
Figure 6:
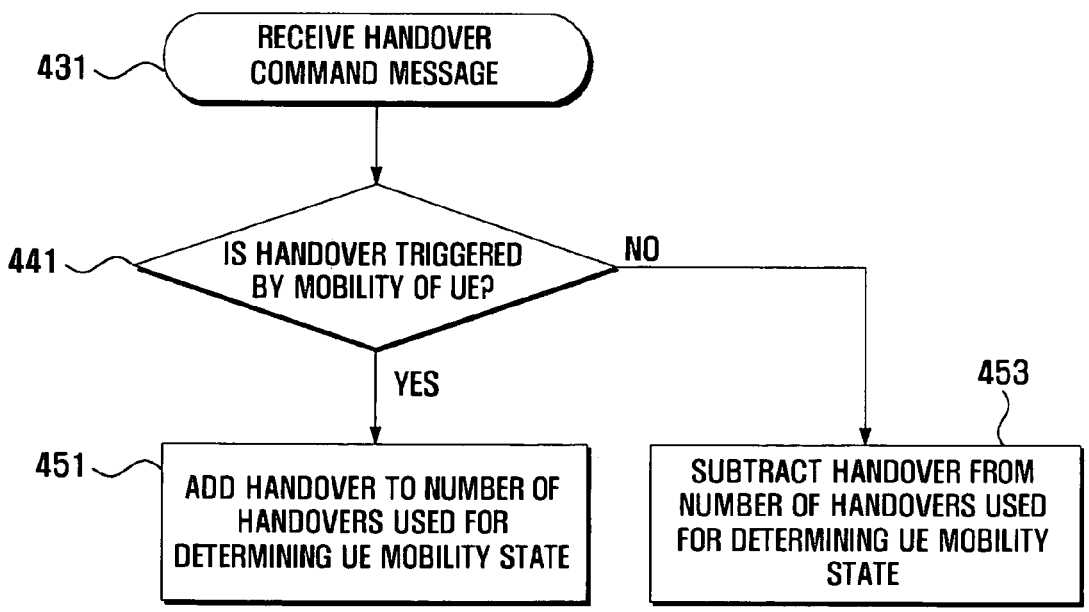
FIG. 6 is a flowchart illustrating operations of the UE for receiving the handover command message in the UE mobility state detection method according to an exemplary embodiment of the present invention.

FIGS. 5 and 6 are flowchart illustrating operations of the UE upon receiving the system information and the handover command message, respectively, for use in the mobility state detection method according to an exemplary embodiment of the present invention. FIG. 5 shows the system information reception process of the UE 201 at step 221 in more detail, and FIG. 6 shows the handover command message reception process of the UE 201 at step 223 in more detail.

Referring to FIG. 5, the UE 201 operating in idle mode or connected mode receives the system information broadcasted by the eNB 203 (401). As aforementioned, the system information includes the cell information (frequency information and cell IDs) of the cells co-located with the current cell. Upon receipt of the system information, the UE 201 determines whether the reselected cell is identical to the previous cell geographically, based on the system information (411). If it is determined that the reselected cell is identical to the previous cell geographically, the UE 201 subtracts the cell reselection from the number of cell reselections used for determining the UE mobility state (421). Otherwise, if it is determined that the reselected cell differs from the previous cell geographically, the UE 201 adds the cell reselection to the number of cell reselections used for determining the UE mobility state (423).

Referring to FIG. 6, the UE 201 operating in connected mode receives the handover command message transmitted by the eNB 203 (431). As aforementioned, the handover command message includes the mobility-triggered handover indicator informing of the factor that triggered the handover. Upon receipt of the handover command message, the UE 201 checks the mobility-triggered handover indicator to determine whether the handover is triggered by movement of the UE 201 or a non-mobility factor (441). If it is determined that the handover is triggered by movement of the UE 201, the UE 201 adds the handover to the number of handovers used for determining the UE mobility state (451). Otherwise, if it is determined that the handover is triggered by a non-mobility factor, the UE 201 subtracts the handover from the number of handovers used for determining the UE mobility state (453).

Figure 7:
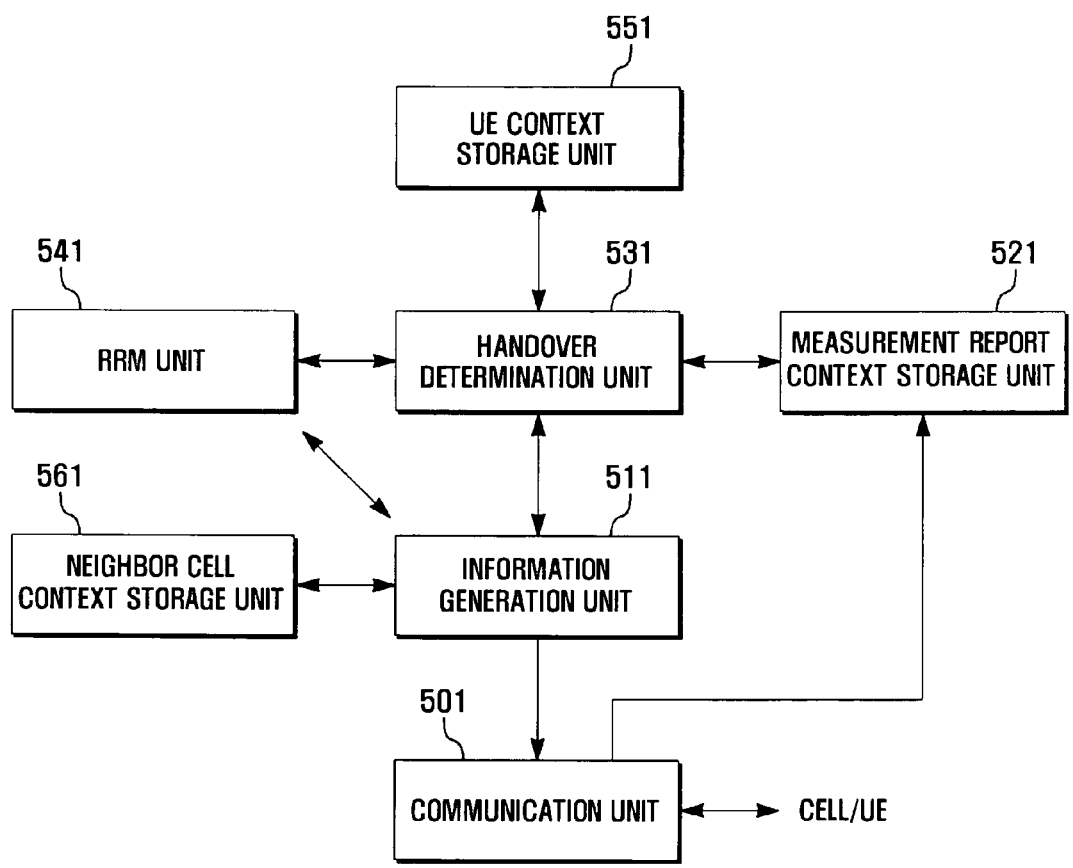
FIG. 7 is a block diagram illustrating a configuration of an eNB for supporting the UE mobility state detection method according to an exemplary embodiment of the present invention.

FIG. 7 is a block diagram illustrating a configuration of an eNB for supporting the UE mobility state detection method according to an exemplary embodiment of the present invention.

As shown in FIG. 7, the eNB includes a communication unit 501, an information generation unit 511, a measurement report context storage unit 521, a handover determination unit 531, an RRM unit 541, a UE context storage unit 551, and a neighbor cell context storage unit 561.

The communication unit 501 is a transceiver responsible for broadcasting the system information within the cell and transmitting and receiving per-terminal message and data. The information generation unit 511 is responsible for generating the handover command message and system information using the handover or system-related information. The measurement report context storage unit 521 stores the measurement information reported by the UEs. The UE context storage unit 551 stores the UE and user contexts. The UE context can include the service context and UE capability context. The RRM unit 541 stores the radio resource management schemes and policies. The neighbor cell context storage unit 561 stores the information about the neighbor cells. The handover determination unit 531 analyzes the information stored in the measurement report context storage unit 521 and the neighbor cell context storage unit 561 and determines the handover of a specific UE served by the eNB.

In the above structured eNB, the handover determination unit 531 determines a handover of a specific UE based on the measurement report information stored in the measurement report context storage unit 521, the radio resource management schemes and policies stored in the RRM unit 541, and the UE information (e.g., user service context and UE capability context) stored n the UE context storage unit 551. If a handover of a specific UE is determined, the handover determination unit 531 determines whether the handover is the mobility-triggered handover or a non-mobility factor-triggered handover, based on the analysis of the contexts and RRM information, and informs the information generation unit 511 of the handover determination result. The information generation unit 511 generates the handover command message including the mobility handover factor indicator indicating whether the handover is triggered by movement of the UE or a non-mobility factor, based on the handover determination result provided by the handover determination unit 531, and transmits the handover command message to the corresponding UE by means of the communication unit 501.

The information generator 511 generates the system information including the frequency information and cell IDs of the cells co-located with the current cell geographically. That is, the information generator 511 discovers the cells (same, identical, and similar cells) geographically co-located with the current cell based on the neighbor cell list retained in the eNB with reference to the information stored in the neighbor cell context storage unit 561 and the RRM unit 541 and generates the system information including the information about the co-located cells. The communication unit 501 broadcasts the system information generated by the information generator 511 within the cell.

Figure 8:
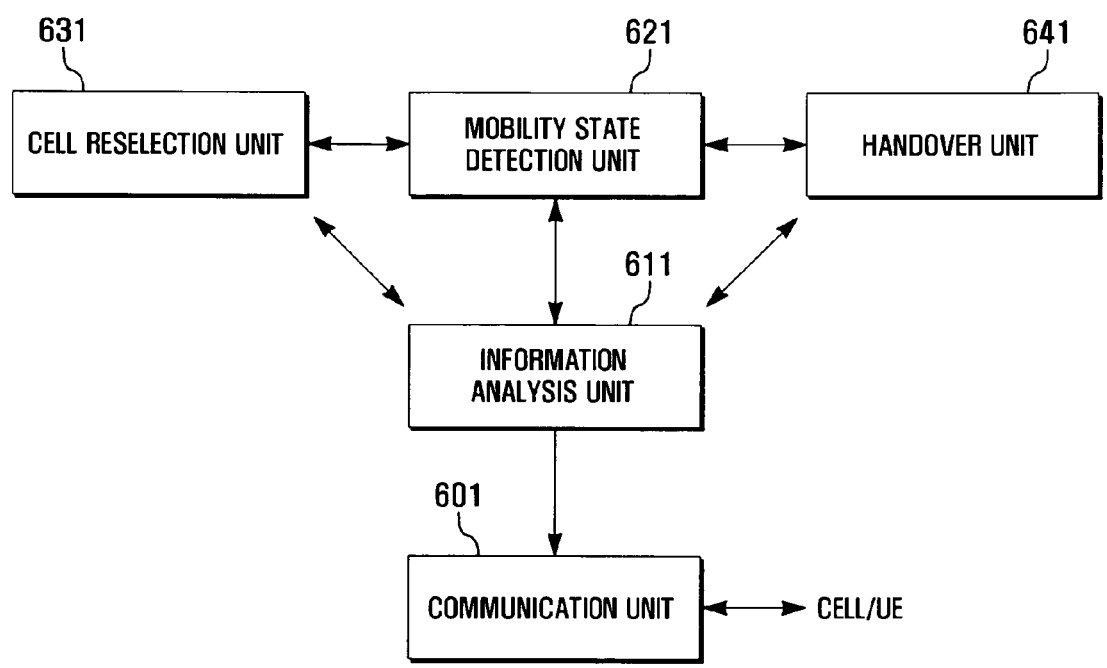
FIG. 8 is a block diagram illustrating a configuration of a UE for supporting the UE mobility state detection method according to an exemplary embodiment of the present invention.

FIG. 8 is a block diagram illustrating a configuration of a UE for supporting the UE mobility state detection method according to an exemplary embodiment of the present invention.

As shown in FIG. 8, the UE includes a communication unit 601, an information analysis unit 611, a mobility state detection unit 621, a cell reselection unit 631, and a handover unit 641.

The communication unit 601 is responsible for receiving the system information broadcasted by the eNB and transmitting and receiving the per-UE messages and data. The information analysis unit 611 analyzes the information received by the communication unit 601. The information can be the system information broadcasted by the eNB or the handover command message transmitted by the eNB. The information analysis unit 611 analyzes the system information and/or the handover command message and determines whether the cell reselection (or handover) is triggered by movement of the UE or a non-mobility factor. The mobility state detection unit 621 adds the cell reselection (or handover) to or subtracts the cell reselection from the number of cell reselections (or handovers) used for determining the UE mobility state depending on the factor triggering the cell reselection (or handover) and detects the UE mobility state based on the counted number of cell reselections (or handovers). The cell reselection unit 631 is responsible for reselecting a cell for maintaining the radio link between the UE and the network based on the information provided by the information analysis unit 611 and the mobility state detection unit 621. The handover unit 641 is responsible for making the handover to from the service cell to a target cell based on the information provided by the information analysis unit 611 and the mobility state detection unit 621.

In the above structured UE, the information analysis unit 611 analyzes the system information broadcasted by the eNB and/or the handover command message transmitted by the eNB. The information analysis unit 611 determines whether the cell reselection (or handover) is triggered by movement of the UE or a non-mobility factor and informs the mobility state detection unit 621 of the determination result. The mobility state detection unit 621 adds the cell reselection (or handover) triggered by movement of the UE to the number of cell reselections (or handover) and subtracts the cell reselection (or handover) triggered by the non-mobility factor from the number of cell reselections (or handovers) used for determining the UE mobility state.

The UE can use the system information and the handover command message selectively for detecting the UE mobility state depending on whether it operates in idle mode or connected mode.

In idle mode, the communication unit 601 receives the system information broadcasted by the eNB, and the information analysis unit 611 analyzes the system information and transfers the information related to the cell reselection to the mobility state detection unit 621. At this time, the information analysis unit 611 checks whether the reselected cell indicated by the system information is co-located with the current cell geographically and informs the mobility state detection unit 621 of the checking result. The mobility state detection unit 621 subtracts the cell reselection, if the reselected cell is co-located with the current cell geographically, from the number of reselections used for detecting the UE mobility state and adds the cell reselection, if the reselected cell is not co-located with the current cell geographically, to the number of cell reselections used for detecting the UE mobility state. Using the number of cell reselections counted in this manner, the mobility state detection unit 621 detects the UE mobility state.

In connected mode, the communication unit 601 can receive the system information broadcasted by the eNB and the handover command message transmitted by the eNB. The system information processing procedure is identical to that described above. When using the handover command message, the communication unit 601 receives the handover command message transmitted by the eNB, and the information analysis unit 611 analyzes the information contained in the handover command message and transfers the analysis result to the mobility state detection unit 621. In more detail, the information analysis unit 611 determines whether the handover is triggered by movement of the UE or a non-mobility factor and transfers the determination result to the mobility state detection unit 621. The mobility state detection unit 621 subtracts the handover from the number the handovers if the handover is triggered by a non-mobility factor, and adds the handover to the number of the handovers if the handover is triggered by movement of the UE. Using the number of handovers counted in this manner, the mobility state detection unit 621 detects the UE mobility state.

Figure 9:
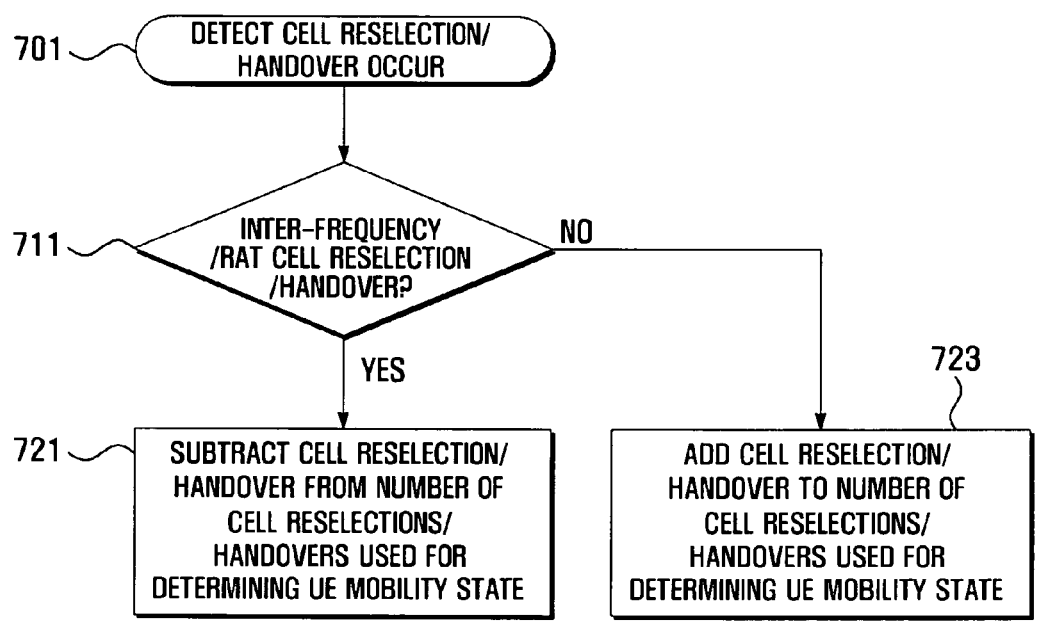
FIG. 9 is a flowchart illustrating a UE mobility state detection method according to another exemplary embodiment of the present invention.

FIG. 9 is a flowchart illustrating a UE mobility state detection method according to another exemplary embodiment of the present invention.

In FIG. 9, there is no need to use information transmitted by the eNB to detect the UE mobility state. If a cell reselection occurs in idle mode or a handover occurs in connected mode, the UE detects the cell reselection or the handover (701). Next, the UE determines whether the cell reselection or the handover is an inter-frequency or inter-Radio Access Technology (inter-RAT) (711). Whether the cell reselection or the handover is an inter-frequency or inter-RAT technology can be determined by comparing the frequency of reselected cell or the handover target cell with that of the previous cell. If both the previous cell and the reselected cell/handover target cell are LTE networks and use different frequency bandwidths, the UE regards the cell reselection/handover as an inter-frequency cell reselection/handover. Meanwhile, if the previous cell is the LTE network and the reselected cell/handover target cell is not the LTE network, the UE regards the cell reselection/handover as an inter-RAT cell reselection/handover. If it is determined that the cell reselection/handover is an inter-frequency/inter-RAT cell reselection/handover, the UE subtracts the cell reselection/handover from the number of cell reselections/handovers used for determining the UE mobility state (721).

Otherwise, if it is determined that the cell reselection/handover is not an inter-frequency/inter-RAT cell reselection/handover, the UE adds the cell reselection/handover to the number of cell reselections/handovers used for determining the UE mobility state (723).

The UE supporting the UE mobility state detection method of FIG. 9 can be configured as shown in FIG. 8. Referring to FIGS. 8 and 9, the information analysis unit 611 determines whether the cell reselection/handover is an inter-frequency/inter-RAT handover, based on the frequency bandwidth information and RAT information of the reselected cell/handover target cell received by the communication unit 601, and transfers the determination result to the mobility state detection unit 621. The mobility state detection unit 621 subtracts, if the cell reselection/handover is an inter-frequency/inter-RAT cell reselection/handover, the cell reselection/handover from the number of cell reselections/handovers, and adds, if the cell reselection/handover is not the inter-frequency/inter-RAT cell reselection/handover, the cell reselection/handover to the number of cell reselections/handovers used for determining the UE mobility state.

As described above, the UE mobility state detection apparatus and method of the present invention allows the UE to add a cell reselection/handover triggered by movement of the UE to the number of cell reselections/handovers and subtract the cell reselection/handover triggered by a non-mobility factor (such as load balancing, UE/user service profile adaptation, UE capability adaptation, and RRM) from the number of cell reselections/handovers used for determining the UE mobility state, thereby improving accuracy of the UE mobility state detection.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting mobility state of a terminal by a base station in a wireless communication system, the method comprising:
transmitting, by the base station, system information including a list of frequencies and cell identifiers of cells adjacent to a current cell geographically through a receiver by the terminal;
transmitting, by the base station, a handover command comprising information on a cause of the handover to a terminal through a transmitter, the handover command indicating a handover to a target cell; and
starting a mobility state detection timer;
when the user equipment is in a connected mode and a handover occurs, determining, by the base station, whether the handover command indicates a handover either to the target cell using a same frequency band as a frequency band of a current cell, or to the target cell using a different frequency band from the frequency band of the current cell based on the cause of the handover;
adding, by the base station, the handover command into a total handover count if the handover command indicates the handover to the target cell using a same frequency band as the frequency band of a current cell based on a result of the determination;
subtracting a handover count related to the handover command from the total handover-count if the frequency band of the target-cell is different from the frequency band of the current cell; and
determining, by the base station, the mobility state of the terminal based on the total handover count,
when the user equipment is in an idle mode and a cell reselection occurs, determining, whether the frequency and cell identifier of the reselected cell is included in the system information from a previous cell;
when the frequency and cell identifier of the reselected cell is included in the system information from a previous cell, subtracting a reselection count related to the cell reselection from a total reselection count and,
when the frequency and cell identifier of the reselected cell is not included in the system information from a previous cell, adding the cell reselection to the total reselection count;
upon expiration of the mobility state detection timer, detecting the mobility state of the terminal when at least one of the total reselection count and the total handover count is above at least one predetermined threshold value.

2. The method of claim 1, wherein the handover command includes a handover factor indicator indicating that whether the handover is triggered by a movement of the terminal, or if the handover occurs for at least one of load balancing, service profile adaptation, terminal capability adaption, and radio resource management, the total handover count is determined based on the handover factor indicator.

3. A method for detecting mobility state by a terminal in a wireless communication system, the method comprising:
receiving, from a base station, system information including a list of frequencies and cell identifiers of cells adjacent to a current cell geographically through a receiver by the terminal;
receiving, by the terminal, a handover command indicating a handover to a target cell from a base station through the receiver, the handover command comprising information on a cause of the handover; and
starting a mobility state detection timer;
when the user equipment is in a connected mode and a handover occurs,
determining, by the terminal, whether the handover command indicates a handover either to the target cell using a same frequency band as a frequency band of a current cell, or to the target cell using a different frequency band from the frequency band of the current cell based on the cause of the handover;
adding, by the terminal, the handover command into a total handover count if the handover command indicates the handover to the target cell using a same frequency band as the frequency band of a current cell based on a result of the determination;
subtracting a handover count related to the handover command from the total handover-count if the frequency band of the target-cell is different from the frequency band of the current cell;
when the user equipment is in an idle mode and a cell reselection occurs, determining, by the terminal, whether the frequency and cell identifier of the reselected cell is included in the system information from a previous cell;
when the frequency and cell identifier of the reselected cell is included in the system information from a previous cell, subtracting a reselection count related to the cell reselection from a total reselection count and, when the frequency and cell identifier of the reselected cell is not included in the system information from a previous cell, adding the cell reselection to the total reselection count;

upon expiration of the mobility state detection timer, detecting the mobility state of the terminal when at least one of the total reselection count and the total handover count is above at least one predetermined threshold value.

4. The method of claim 3, wherein the handover command includes a handover factor indicator indicating whether the handover is triggered by a movement of the terminal or if the handover occurs for at least one of load balancing, service profile adaptation, terminal capability adaption, and radio resource management, the handover count determined based on the handover command.

5. The method of claim 3, further comprising: receiving system information including cell identifiers of cells adjacent to the current cell geographically, the system information comprising frequency information of the cells adjacent to the current cell.

6. A base station for detecting a mobility state of a terminal in a wireless communication system, the base station comprising:

a transceiver for transmitting and receiving a signal; and
a controller configured to:
transmit system information including a list of frequencies and cell identifiers of cells adjacent to a current cell geographically to the terminal;
transmit a handover command to a terminal, the handover command indicating a handover to a target cell, the handover command comprising information on a cause of the handover;
start a mobility state detection timer;
when the user equipment is in a connected mode and a handover occurs, determine whether the handover command indicates a handover either to the target cell using a same frequency band as a frequency band of a current cell, or to the target cell using a different frequency band from the frequency band of the current cell based on the cause of the handover;
add the handover command into a total handover count if the handover command indicates the handover to the target cell using a same frequency band as the frequency band of a current cell based on a result of the determination;
subtract a handover count related to the handover command from the total handover-count if the frequency band of the target-cell is different from the frequency band of the current cell;
when the user equipment is in an idle mode and a cell reselection occurs, determine whether the frequency and cell identifier of the reselected cell is included in the system information from a previous cell;
when the frequency and cell identifier of the reselected cell is included in the system information from a previous cell, subtract a reselection count related to the cell reselection from a total reselection count and,
when the frequency and cell identifier of the reselected cell is not included in the system information from a previous cell, add the cell reselection to the total reselection count; and
upon expiration of the mobility state detection timer, detect the mobility state of the terminal when at least one of the total reselection count and the total handover count is above at least one predetermined threshold value.

7. The base station of claim 6, wherein the handover command includes a handover factor indicator indicating whether the handover is triggered by a movement of the terminal, or if the handover occurs for at least one of load balancing, service profile adaptation, terminal capability adaption, or radio resource management.

8. A terminal for detecting mobility state in a wireless communication system, the terminal comprising:

a transceiver for transmitting and receiving a signal; and
a controller configured to:
receive, from a base station, system information including a list of frequencies and cell identifiers of cells adjacent to a current cell geographically through the transceiver;
receive a handover command indicating a handover to a target cell from a base station, the handover command comprising information on a cause of the handover;
start a mobility state detection timer;
when the user equipment is in a connected mode and a handover occurs,
determine whether the handover command indicates a handover either to the target cell using a same frequency band as a frequency band of a current cell, or to the target cell using a different frequency band from the frequency band of the current cell based on the cause of the handover;
add the handover command into a total handover count if the handover command indicates the handover to the target cell using a same frequency band as the frequency band of a current cell based on a result of the determination;
subtract a handover count related to the handover command from the total handover-count if the frequency band of the target-cell is different from the frequency band of the current cell;
when the user equipment is in an idle mode and a cell reselection occurs, determining, by the terminal, whether the frequency and cell identifier of the reselected cell is included in the system information from a previous cell;
when the frequency and cell identifier of the reselected cell is included in the system information from a previous cell, subtract a reselection count related to the cell reselection from a total reselection count and,
when the frequency and cell identifier of the reselected cell is not included in the system information from a previous cell, add the cell reselection to the total reselection count;
upon expiration of the mobility state detection timer, detect the mobility state of the terminal when at least one of the total reselection count and the total handover count is above at least one predetermined threshold value.

9. The terminal of claim 8, wherein the handover command includes a handover factor indicator indicating whether the handover is triggered by movement of the terminal, or if the handover occurs for at least one of load balancing, service profile adaptation, terminal capability adaption, or radio resource management.

* * * * *